(12) United States Patent
Chauncey

(10) Patent No.: US 8,567,145 B1
(45) Date of Patent: Oct. 29, 2013

(54) MASONRY INSULATION AND SIDING CONNECTOR

(71) Applicant: James Russell Chauncey, Bend, OR (US)

(72) Inventor: James Russell Chauncey, Bend, OR (US)

( * ) Notice: Subject to any disclaimer, the term of this patent is extended or adjusted under 35 U.S.C. 154(b) by 0 days.

(21) Appl. No.: 13/913,673

(22) Filed: Jun. 10, 2013

Related U.S. Application Data

(62) Division of application No. 13/209,915, filed on Aug. 15, 2011.

(60) Provisional application No. 61/374,532, filed on Aug. 17, 2010.

(51) Int. Cl.
  *E04B 2/00* (2006.01)
  *E04B 5/00* (2006.01)
  *E04B 9/00* (2006.01)

(52) U.S. Cl.
  USPC ..... 52/506.05; 52/404.2; 52/404.3; 52/407.1; 52/461; 52/396.04; 52/775

(58) Field of Classification Search
  USPC ............ 52/282.1, 407.1, 407.3, 407.4, 404.3, 52/506.01, 506.04, 506.05, 700, 460, 461, 52/464, 468, 781.5, 775, 396.04, 396.06, 52/396.07
  See application file for complete search history.

(56) References Cited

U.S. PATENT DOCUMENTS

| | | | | |
|---|---|---|---|---|
| 3,213,584 | A * | 10/1965 | Bush | 277/649 |
| 3,760,544 | A * | 9/1973 | Hawes et al. | 52/468 |
| 3,994,471 | A * | 11/1976 | Turolla | 249/205 |
| 4,362,427 | A * | 12/1982 | Mass et al. | 404/64 |
| 4,568,215 | A * | 2/1986 | Nelson | 403/13 |
| 5,934,729 | A * | 8/1999 | Baack | 296/39.1 |
| 6,843,025 | B2 * | 1/2005 | Paz | 52/79.1 |
| 7,059,577 | B1 * | 6/2006 | Burgett | 249/40 |
| 2003/0070379 | A1 * | 4/2003 | Worley | 52/506.05 |
| 2009/0145070 | A1 * | 6/2009 | Linn et al. | 52/465 |
| 2010/0095620 | A1 * | 4/2010 | Wilkes, Jr. | 52/396.04 |
| 2010/0180410 | A1 * | 7/2010 | Kalyanadurga et al. | 24/595.1 |
| 2012/0055109 | A1 * | 3/2012 | Labonte et al. | 52/506.05 |

* cited by examiner

*Primary Examiner* — Brian Glessner
*Assistant Examiner* — Brian D Mattei
(74) *Attorney, Agent, or Firm* — Hancock Hughey LLP

(57) ABSTRACT

A connector strip is mechanically pressed into a slot formed in a concrete wall. The connector strip has a distal end with resilient, deformable legs that engage the walls of the slot—when the strip is pressed into the slot the legs deform from a resting position and press against the walls of the slot, preventing the strip from being pulled out of engagement in the slot. The proximal end of the connector strip is defined by transverse retaining arms that retain insulation board against the concrete, and which serve as a surface into which siding and sheetrock may be anchored with nails or screws.

16 Claims, 6 Drawing Sheets

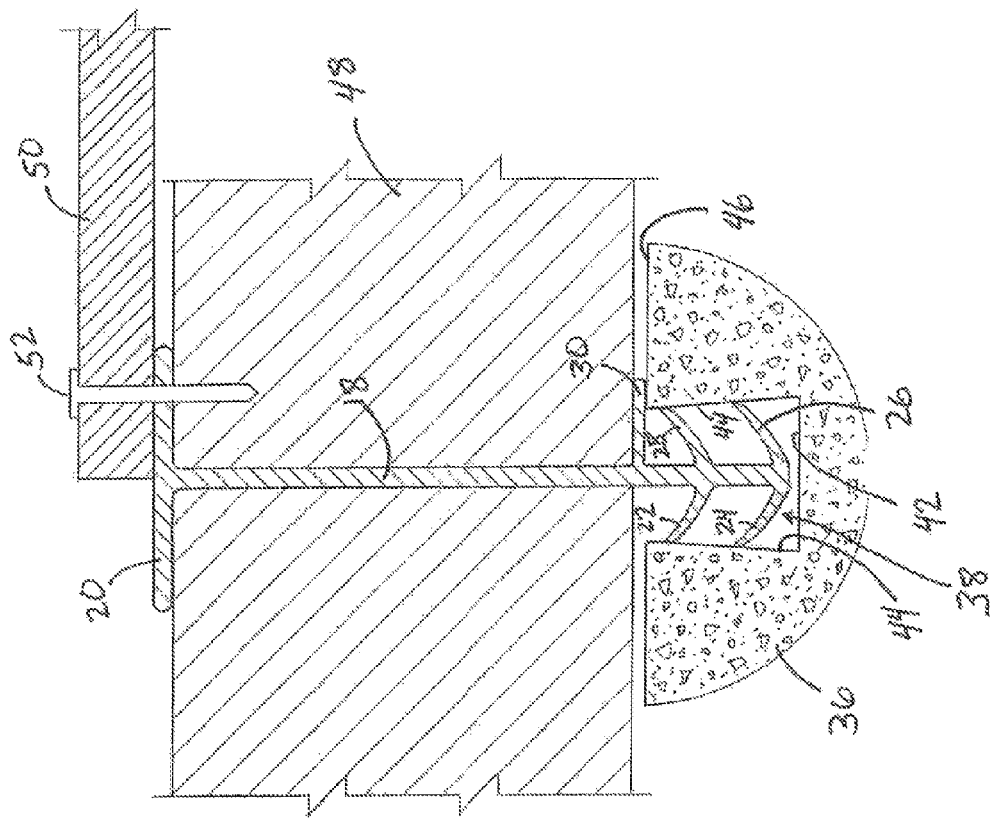

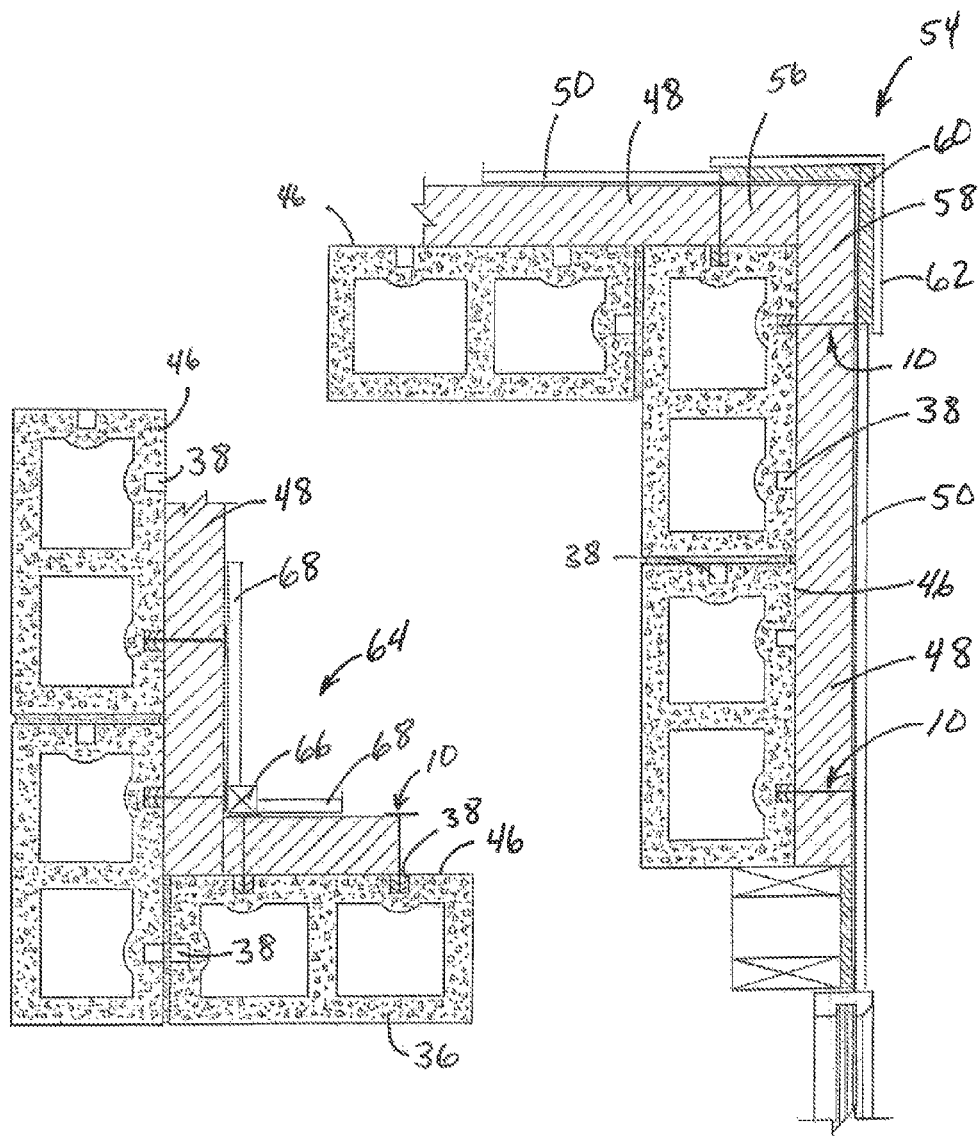

MASONRY INSULATION AND SIDING CONNECTOR

TECHNICAL FIELD

The present invention relates to a plastic extrusion used for attaching insulation board and siding or sheetrock to cement block or concrete walls on new construction or retrofitted on existing buildings, and more specifically, to an extruded member that has a distal end that lodges in a slot formed or cut in the wall and has retaining arms on the proximal end that serve to attach to the insulation board and provide a base to which siding or wall paneling may be nailed.

BACKGROUND

Cement blocks and precast concrete walls are useful in many types of construction. While these materials have many useful characteristics that lead to their frequent use, it is known that concrete walls without added insulation do not have high thermal resistance or insulating properties and can therefore benefit from added insulation for improving energy efficiency. And many building owners want siding materials over concrete to improve the aesthetic appearance of the structures. But attaching additional layers of building materials such as insulating panels and siding to concrete walls is often difficult and time consuming. For instance, both insulating materials and siding may be attached to concrete blocks and cast concrete walls by drilling holes in the concrete and using concrete anchors to attach the building materials. But drilling concrete is often difficult and in the best of situations this is a labor intensive practice that adds to the cost of construction. Nonetheless, many buildings that incorporate concrete wall construction include both insulation and siding materials for energy efficiency and aesthetics.

The present invention provides an apparatus and method for overcoming the problems associated with attaching insulating layers and exterior (and interior) covering layers to concrete walls.

The invention is defined by an extruded connector strip that is mechanically pressed into a slot formed or cut in the concrete wall. If the wall is fabricated from concrete blocks the slot is formed during casting of the blocks; if the wall is fabricated from cast concrete the slot may be formed during casting and if the wall is already in place, the slot may be cut into the wall. The connector strip has a distal end with resilient, deformable legs that engage the walls of the slot—when the strip is pressed into the slot the legs deform from a resting position and press against the walls of the slot, preventing the strip from being pulled out of engagement in the slot. The proximal end of the connector strip is defined by T-shaped, transverse retaining arms that retain insulation board against the concrete, and which serve as a surface into which siding and sheetrock may be anchored with nails or screws. The connector strip is thus a single piece that requires no drilling of the masonry and which allows mechanical attachment of insulation and siding to either the exterior or interior wall of concrete buildings.

The connector strip may be used above grade level and below grade for basement or earth sheltered building construction.

A building that utilizes the connector strip according to the present invention has improved thermal efficiency and improved insulation value, with associated reductions in heat loss, improved comfort, and economic savings through reduced heating and cooling expenses.

BRIEF DESCRIPTION OF THE DRAWINGS

The invention will be better understood and its numerous objects and advantages will be apparent by reference to the following detailed description of the invention when taken in conjunction with the following drawings.

FIG. 3 is a cross sectional view showing the connector strip of the present invention assembled with a concrete wall, and attaching insulating board and siding to the strip.

FIG. 4 is a sectional view of a wall assembly constructed using the connector strip according to the present invention and showing an inside corner design.

FIG. 5 is a view similar to FIG. 4 except showing use of the connector strip according to the present invention used in connection with an outside corner design.

DETAILED DESCRIPTION OF ILLUSTRATED EMBODIMENTS

Figure 1:
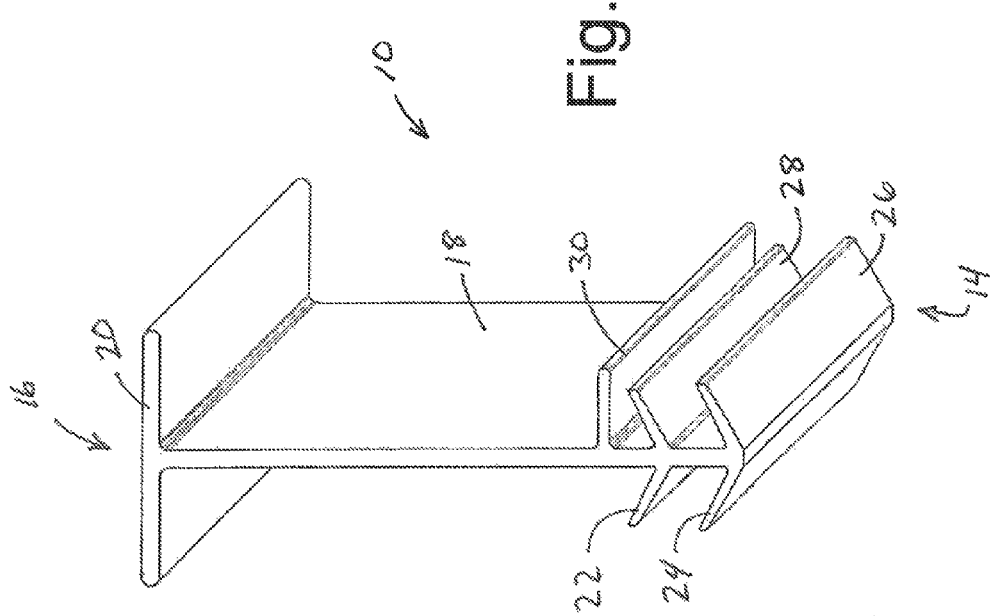
FIG. 1 is a perspective view of a section of extruded connector strip according to a first illustrated embodiment of the present invention.

A first illustrated embodiment of a connector strip 10 according to the present invention is shown in isolation in FIG. 1. Connector strip 10 is preferably fabricated from as a monolithic, one-piece unit from a plastic material that has the desired properties of strength and rigidity, yet which is both resilient and deformable in relevant portions as detailed herein. There are numerous polymeric materials that will suffice for use in fabricating the connector strip, and since the strip is preferably formed of a polymeric material it may be extruded into long sections for delivery to a job site in a convenient form such as a bundle. On the job site the strip is cut to desired lengths.

Relative directional terms are used at times to describe parts of the invention and relative positions of the parts. As a naming convention, the ground plane is considered to be the surface of the ground (reference number 12, FIG. 7) and, for purposes herein, is considered to be horizontal although of course in use the ground plane has slope and irregularities. Other relative directional terms correspond to this convention: "upper" refers to the direction above and away from the ground plane; "lower" is generally in the opposite direction, and so on.

With reference to FIG. 1, it will be understood that the connector strip 10 as used at a job site is an elongate member that is cut to length; however, in FIG. 1 only a short section of the connector strip is illustrated in order to describe the structure. The distal end of connector strip 10 is identified with reference number 14 and the proximal end of the strip is identified with reference number 16. As detailed below, the distal end 14 is the end that is mechanically lodged in a slot or groove formed in a concrete wall. The connector strip is defined by a central, elongate rib member 18 that terminates at the proximal end 16 at a T-shaped, transverse nailing member 20 that extends away from the central rib 18 on both sides thereof and which defines a portion of a slot for receiving an insulation board and also a seat for nails that attach siding to the connector strip. Plural deformable retaining legs 22 and 24 are formed at the distal end 14 of the central rib member 18 of the connector strip 10 on one side of the strip, and deformable retaining legs 26 and 28 are formed on the opposite side of the strip. The retaining legs define the means by which the strip lodges in the concrete block. The retaining legs 22, 24, 26 and 28 are angled relative to the central rib 18 so that the distal end 14 of connector strip 10 takes on a generally arrow or pointed shape. As noted, the material used to fabricate connector strip 10 is resilient and deformable. As such, the retaining legs are deformable. In a resting position the retaining legs normally assume the general orientation shown in FIG. 1. However, as detailed below and as shown in FIG. 3, when the connector strip is pressed into a slot in the concrete the retaining legs press against the walls of the slot and are deformed such that the legs are bent back toward the central rib 18. Because the legs are resilient, they exert an outwardly directed pressure against the walls of the slot. When a pulling pressure is exerted against the connector strip 10 tending to pull the strip out of its connection with the concrete slot, the legs dig into the walls of the slot to prevent removal of the strip. This defines a very secure connection of the strip 10 to the concrete wall.

Adjacent retaining leg 28 is a stop member 30 formed on one side of central rib 18 and extending transverse to the central rib. The stop member extends away from the rib 18 far enough that the stop abuts the surface of the concrete wall when the connector strip is attached to a wall, as detailed below.

Figure 2:
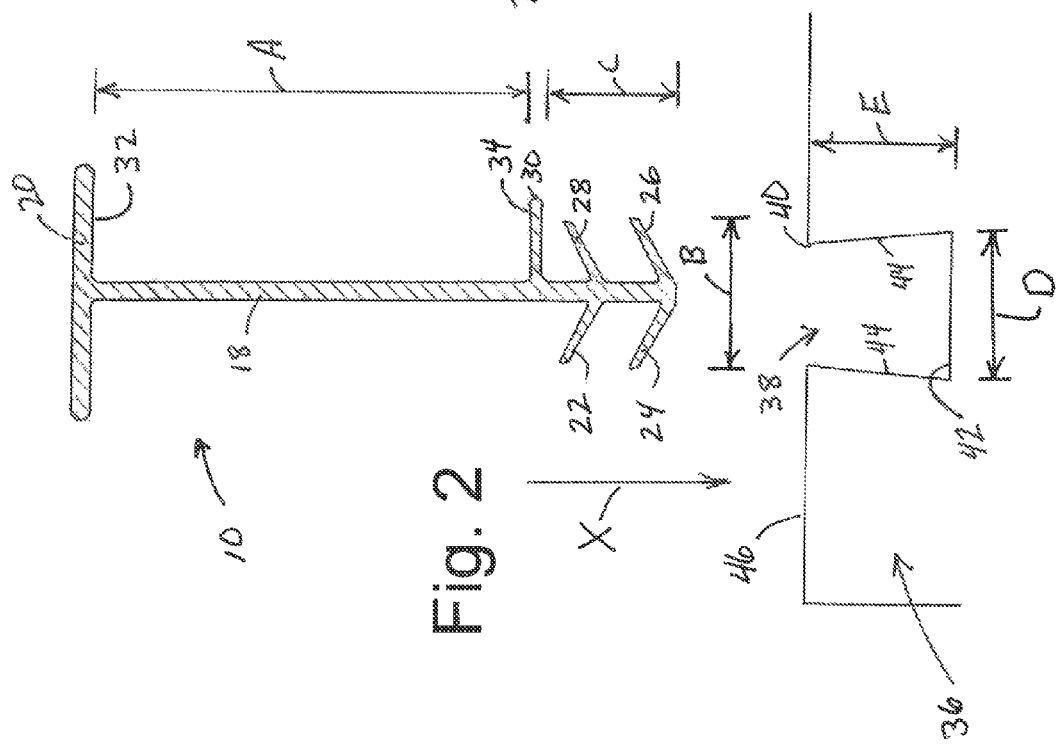
FIG. 2 is an end elevational view of the extruded connector strip of FIG. 1, showing the strip in relation to a section of a concrete wall such as that formed by a concrete block or precast concrete wall.

With reference now to FIG. 2, the distance between the interior surface of nailing member 20—that is, surface 32, and the facing interior surface of stop member 30—surface 34—is defined and identified as dimension A. The dimension in FIG. 2 shown as dimension B is the width of connector strip 10 measured between the outermost tips of opposed retaining legs, such as legs 24 and 26. As detailed below, the space between surfaces 30 and 34 defines a recess into which insulation board rests in the assembled wall section. The size of dimension A may be varied to accommodate insulation board of different thicknesses, and standard sizes for dimension A are nominally 2, 3 or 4 inches. The width defined by dimension B is determined by the width of the slot cut in the concrete block, as described below. Dimension C is the distance from the tip of distal end 14 to stop 30.

With continuing reference to FIG. 2, connector strip 10 is shown adjacent a portion of a concrete wall identified with reference number 36. Concrete wall (or portion of a wall such as a concrete block) 36 may be a portion of a concrete block, a precast wall section, or an existing wall section. Concrete wall has a slot 38 formed therein. In most instances, the slot 38 will extend vertically on the finished wall. If the wall if made of concrete blocks, the slot 38 is formed in the cement block during casting and may be formed at the appropriate spacing such as on 8, 16 or 24 inch centers. If the wall is made of precast concrete the slot 38 may be cut into the wall (as in the case where connector strip 10 is being retrofitted onto an existing building), or may be formed during casting of the wall. Typically, a new tilt-up concrete wall is cut to provide a slot 16 or 24 inches on center to accept the connector strip 10.

Slot 38 is dimensioned to accept the distal end 14 of connector strip 10 and to firmly and securely retain the strip 10 lodged in the slot. The cross sectional configuration of slot 10 is preferably as shown in FIG. 2, where the width of the slot at its opening 40 is slightly narrower than the width of the slot at its interior terminus 42 so that the interior walls 44 of the slot 38 are slightly angled. Dimension D is defined as the width of slot 38 at its widest point between interior walls 44. However, the slot 38 may just as well be formed with vertical interior walls 44—that is, walls that are at right angles to the outer surface 46 of the concrete block 36, in which case the width of the slot 38 is equal to dimension D at all points. The dimension shown as dimension E is the depth of slot 38 measured from outer surface 46 to the terminus 42 of slot 38.

Turning now to FIG. 3, the method of installation of connector strip 10 with concrete wall 36 and insulation board and siding will be detailed. The concrete wall 36 that is being insulated will have a vertical slot 38 extending along the length of the wall that is to be insulated. In the case of a wall 36 made from cement blocks, the slots 38 in adjacent blocks are in alignment when the blocks are stacked and mortared or dry stacked in place to define vertical slots 38 extending along the vertical length of the wall. An elongate piece of connector strip 10 is cut to an appropriate length and the distal end 14 of the strip 10 is inserted into slot 38. A mallet is then used to tap on the proximal end 16 to drive the proximal end 14 into slot 38. The width of connector strip defined by dimension B is greater than the width of slot 38 at its widest point (e.g., dimension D, FIG. 2). As such, once the opposed retaining legs 26, 26 and 22 and 28 enter slot 38 the outer ends of the retaining legs bear against the interior walls of the slot and some amount of force supplied by the mallet is required to drive the connector strip into the slot. As the connector strip 10 is driven into the slot 38 (arrow X, FIG. 2), the retaining legs bear against the interior walls 44 of slot 38 and are deformed away from the resting position shown in FIGS. 1 and 2 and are deflected toward central rib 18 as shown in FIG. 3. Because the retaining legs are resilient, when engaged in slot 38 as in FIG. 3 the legs exert a pushing force against the interior walls 44 of the slot.

The connector strip 10 is tapped into slot 38 until stop 30 abuts the outer surface 46 of block 36—the distance from the tip of distal end 14 to stop 30 (dimension C) is preferably slightly less than the depth of slot 38 (dimension E), so the stop defines an end point beyond which the connector strip cannot be further driven into the slot. The stop 30 is shown as being on just one side of central rib 18 but it will be understood that the stop may extend on both sides of the central rib. The length of stop 30 measured from central rib 18 to the distal end of the stop is greater than ½ of the width of the connector at dimension B. As such, the stop 30 always abuts and engages surface 46 to stop the connector strip's travel into slot 38.

In still another alternative, the stop 30 may be omitted in which case the tip of distal end 14 defines a stop when it abuts terminus 42 of slot 38.

With the connector strip 10 pressed into slot 38 as just described, the connector strip is firmly and securely attached to the concrete wall 36. The retaining legs 22, 24, 26 and 28 hold the strip 10 strongly in place and prevent removal of the strip except with substantial pulling force. Thus, when a force is applied to strip 10 in the direction opposite arrow X (FIG. 2), the retaining legs dig into the side walls 44 and the friction prevents removal of the strip. Appropriate construction adhesive may optionally be applied in slot 38 to enhance the security of the attachment of the strip 10 to wall 36.

With one connector strip 10 attached to wall 36, a section of insulation board 48 is inserted into the space defined between central rib 18, nailing member 20 and stop 30. The insulation board 48 is of a size appropriate for dimension A, which is the width of the space into which the board 48 fits as shown in FIG. 3. Typical insulation board 48 is 15 15/16 or 23 1516 inches in width. A second connector strip 10 is attached to the opposite edge of the insulation board 48 and the second connector strip 10 is attached to the slot 38 in wall 36 as described above. The process is repeated over the part of the wall 36 that is to be insulated.

Once the insulation board 48 is applied over the entire wall, exterior siding 50 (or interior covering such as sheetrock 50) may be installed. The siding 50 is nailed with appropriate fasteners such as nails 52 (preferably ring shank nails) or screws driven through the siding 50 and the nailing member 20. The connection between the nails 52 and the plastic nailing member 20 is very secure and prevents unintended removal or loosening of the siding over time.

FIGS. 4 and 5 are details of use of the connector strip 10 according to the present invention in a typical outside corner detail (FIG. 5, including a window wrap detail), and a typical inside corner detail (FIG. 4). In both figures the surface 46 of the cement wall to which insulation board 48 is applied comprises the outer surfaces of plural cement blocks. Each block has two slots 38 into which connector strips 10 are inserted and assembled with insulation boards 48. With reference to FIG. 5, at the exterior corner 54 there are two relatively narrow pieces of insulation board (reference numbers 56 and 58) that define the corner and which are attached to the most adjacent connector strips 10 as detailed above with fasteners 52 (not shown). A corner covering 60 and decorative covering 62 are fastened to the connector strips in the same manner. The corner covering 60 and covering 62 are preferably complimentary to the siding 50. The interior corner 64 of FIG. 4 is analogous but includes a corner molding strip 66 to which the interior wall surface such as sheetrock 68 is attached with fasteners driven through the sheetrock and into the transverse nailing members 20 of the connector strips 10.

Figure 6:
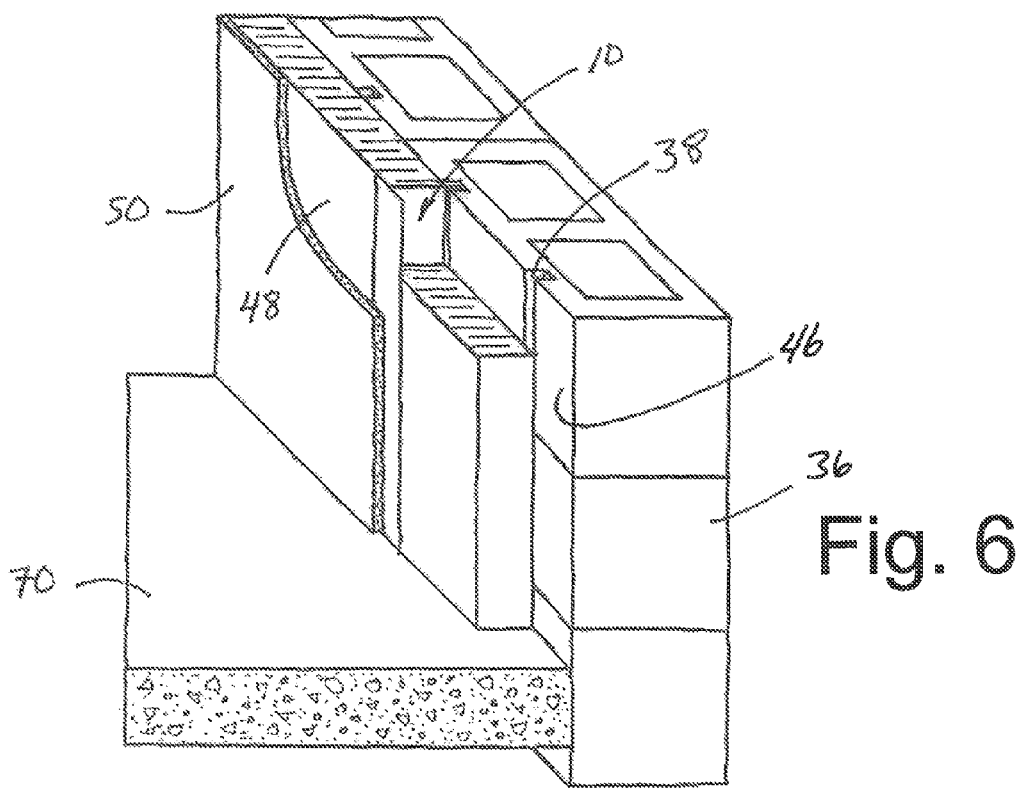
FIG. 6 is a partial sectional view showing an exemplary construction layout using the connector strip of the present invention to insulate a concrete wall and attach a siding material such as sheetrock to the insulation board.

FIG. 6 illustrates an installation using connector strips 10 where the insulation board 48 abuts a concrete pad 70. This could be either an interior or exterior installation.

Figure 7:
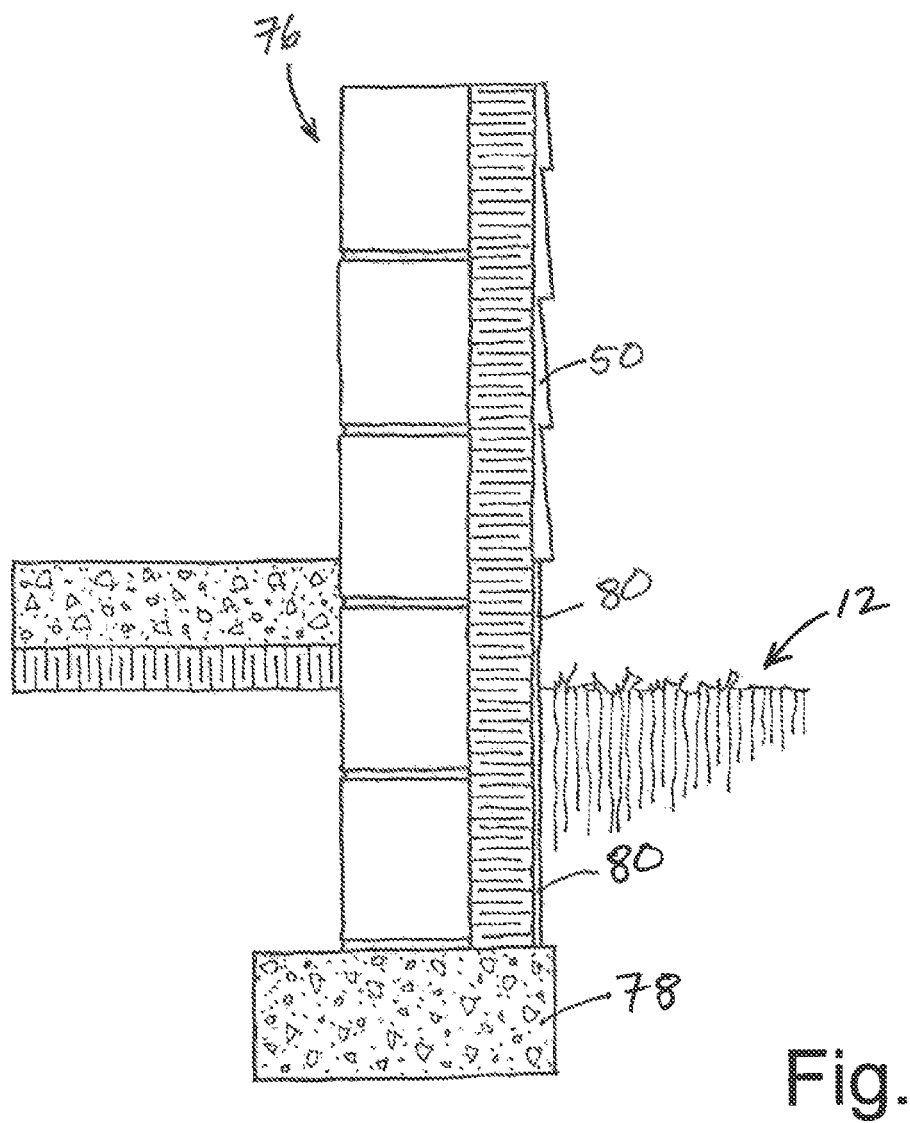
FIG. 7 is a partial sectional view illustrating use of a construction layout where a portion of the wall is below grade level.

FIG. 7 is an illustration showing use of the connector strips 10 in an installation that is both above ground level 12 and below grade. In this instance the concrete block wall 76 is laid on a typical concrete footing 78 that is below ground level 12. Because connector strip 10 (not shown in FIG. 7) is plastic, it may be installed in direct contact with the ground without worry about degradation. Typically, siding such as a lap siding 50 is installed above ground and an appropriate in-ground siding material 80 is installed below ground level and slightly above the interface at the surface of the ground.

Figure 9:
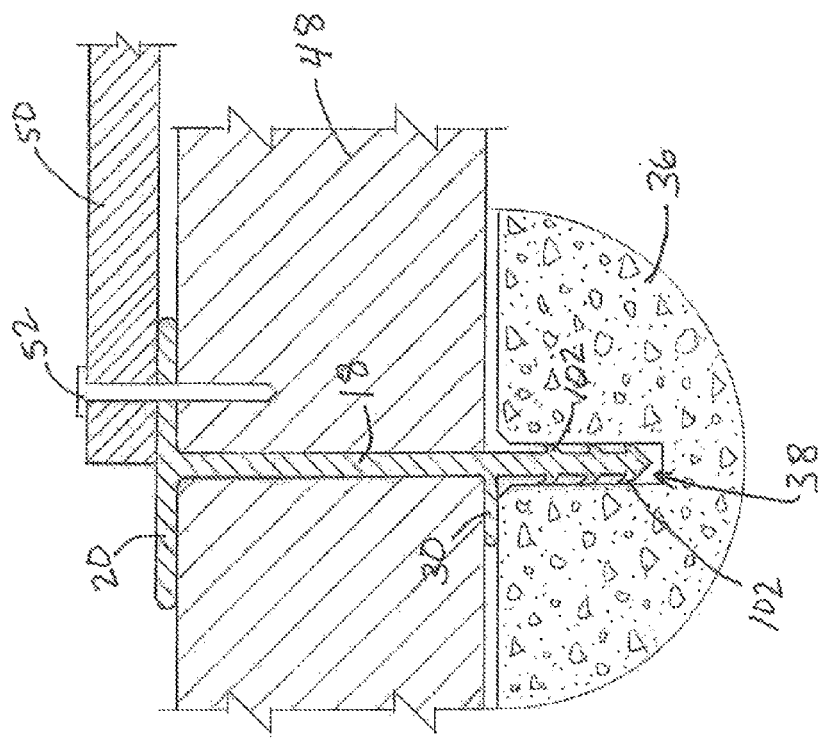
FIG. 9 is a cross sectional view showing the alternative connector strip shown in FIG. 8 assembled with a concrete wall, and attaching insulating board and siding to the strip.
Figure 8:
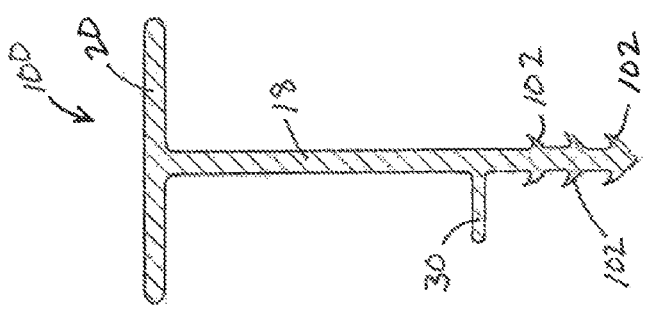
FIG. 8 is an elevational and sectional view of an alternative embodiment of a connector strip according to the present invention.

FIG. 8 shows a first alternative embodiment of a connector strip 100 in which the retaining members for holding the strip 100 in a slot 38 are defined by resilient hooks 102 formed on both sides of the strip. The structural components of connector strip 100 in FIG. 8 are otherwise as described above with respect to connector strip 10. The connector strip 100 is shown in an assembled wall in FIG. 9 where it may be seen that the strip 100 is functionally identical to the strip 10.

It will be appreciated that variations in the structure of strip 10 and 100 may be made without departing from the functionality of the device. For example, in the preferred embodiments described above and shown in the drawings the connector strip 10, 100 is a single elongate strip. It will be appreciated that several shorter sections of connector strip may be used with equal result. Likewise, the connector strip may be formed in a short piece such as a spike with either round or square configuration and plural such pieces used, in which case the slot 38 described above may be used to receive the spike or a hole of appropriate size and shape may be used. It will also be appreciated that the general word "siding" as used herein contemplates innumerable kinds of exterior and interior siding materials such as lap siding, plywood, sheetrock, etc.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A connector strip, insulation board and pre-existing wall combination, comprising:
    (a) at least two elongate connector strips, each having
        a central rib section;
        a nailing member extending transverse to the central rib section at a proximal end thereof;
        at least one pair of opposed resilient retaining legs extending from the central rib section at a distal end, said at least one pair of opposed retaining legs having distal ends; and
        a stop member extending transverse to the central rib section on at least one side thereof between the nailing member and the at least one pair of opposed resilient retaining legs to define an insulation board receiving space between the nailing member and the stoop member;
    (b) a pre-existing wall having at least two adjacent elongate and spaced apart slots formed therein and extending along the length of the wall, each of said slots having a width between opposed interior walls and a depth;
        wherein the width of the opposed retaining legs of the elongate connector strip in a first position measured from the distal end of one of the pair to the distal end of the opposite of the pair is greater than the width of the elongate slots in the pre-existing wall;
        wherein a first elongate connector strip is attached to the first of the two adjacent elongate slots in the pre-existing wall with the at least one pair of opposed resilient retaining legs of said elongate connector strip inserted into the slot so that the opposed retaining legs bear against the opposed interior walls of the slot and thereby resist removal of said first elongate connector strip from said slot, and a second elongate connector strip is attached to the second of the two adjacent elongate slots in the pre-existing wall with the at least one pair of opposed resilient retaining legs of said elongate connector strip inserted into the slot so that the opposed retaining legs bear against the opposed interior walls of the slot and thereby resist removal of said second elongate connector strip from said slot;
        wherein the elongate connector strips have a length sufficient to attach insulation board and siding to the at least two connector strip such that said insulation board and siding are applied over the entire pre-existing wall; and
    (c) insulation board having first and second opposed side edges, wherein the first of said opposed side edges is received in the insulation board receiving space of one elongate connector strip and the second of said opposed edges is received in the insulation board receiving space of the second of the at least two elongate connector strips.

2. The combination according to claim 1 in which the nailing member extends from the central rib section on both sides thereof.

3. The combination according to claim 1 wherein the connector is a one-piece member in which each leg of the at least one pair of opposed retaining legs is normally urged toward the first position, and the retaining legs are movable to a second position when the connector is attached to the wall by inserting said opposed retaining legs into the slot, wherein the opposed retaining legs define a second position in which the width is less than the first width to prevent removal of the connector from the slot into which it is inserted.

4. The combination according to claim 3 wherein the distance from the stop to the distal end of the central rib section is less than the depth of the slot.

5. The combination according to claim 4 including plural opposed pairs of retaining legs.

6. The combination according to claim 5 wherein all of the retaining legs are attached to the central rib section at an acute angle.

7. The combination according to claim 3 wherein the stop extends from only one side of the central rib member and extends a distance greater than ½ of the first width.

8. The combination according to claim 1 wherein the pre-existing wall is defined by plural cement blocks, each of said blocks having a slot formed therein that aligns with a slot in an adjacent cement block.

9. An elongate connector, insulation board and pre-existing wall combination, comprising:
plural one-piece elongate strips, each of said strips defined by
an elongate central section having first and second sides;
a nailing member extending from the first and second sides transverse to the elongate central section at a proximal end;
resilient retaining means at a distal end of the elongate central section for retaining the connector in a slot in a pre-existing wall, said resilient retaining means configured for insertion into an elongate slot formed in said wall; and
a stop between the nailing member and the retaining means to define an insulation board receiving space between the nailing member and the stop; and
plural elongate slots formed in said pre-existing wall, each of said slots extending along the entire length of the wall and wherein a first elongate strip is attached to and retained in one slot in the pre-existing wall and a second elongate strip is attached to and retained in an adjacent slot in the pre-existing wall, with said resilient retaining means of said elongate strips being inserted into said elongate slots to thereby resist removal of said elongate strips from said elongate slots;
wherein the elongate strips and elongate slots have a length sufficient to attach insulation board and siding to the elongate strips such that said insulation board and siding are applied over the entire pre-existing wall; and
insulation board having opposed side edges, wherein one of said opposed side edges is received in the insulation board receiving space of the first elongate strip and the other of said opposed edges is received in the insulation board receiving space of the adjacent of the second elongate connector strip.

10. The combination according to claim 9 wherein the resilient retaining means includes at least first and second opposed retaining legs extending from the central section at acute angles relative thereto, the first retaining leg extending from a first side of the elongate central section and the second retaining leg extending from the second side of the elongate central section.

11. The combination according to claim 10 including plural pairs of first and second opposed resilient retaining legs extending from the central section.

12. The combination according to claim 11 wherein the resilient retaining legs are normally in a first position defining a first width that is greater than the width of a elongate slot into which the retaining legs may be inserted, and the resilient retaining legs are movable to a second position when inserted into said slot, wherein in the second position the resilient retaining legs define a second width that is less than the first width to prevent removal of the connector from the slot into which it is inserted.

13. A connector strip, insulation board and pre-existing wall combination, comprising:
(a) a pre-existing wall having plural parallel vertically extending continuous elongate slots formed therein and spaced apart from one another, each of said slots having a width between opposed interior walls and a depth;
(b) plural elongate connector strips, each having a central rib section, a nailing member extending transverse to the central rib section at a proximal end thereof, and at least one pair of opposed resilient retaining legs extending from the central rib section at a distal end, said at least one pair of opposed retaining legs having distal ends wherein the width of the opposed retaining legs in a first position measured from the distal end of one of the pair to the distal end of the opposite of the pair is greater than the width of the elongate slots in the pre-existing wall, and each of said connector strips having a stop member extending transverse to the central rib section on at least one side thereof between the nailing member and the at least one pair of opposed retaining legs to define an insulation board receiving space between the nailing member, the stop and the central rib section;
(c) wherein at least two elongate connector strips are attached to at least two adjacent elongate slots in the pre-existing wall and the elongate connector strips have a length sufficient to attach insulation board between therebetween such that the insulation board is received in the insulation board receiving space in each of said connector strips; and
(d) insulation board having first and second opposed side edges, wherein the first of said opposed side edges is received in the insulation board receiving space of one of the at least two elongate connector strips and the second of said opposed edges is received in the insulation board receiving space of the second of the at least two elongate connector strips.

14. The combination according to claim 13 wherein the pre-existing wall is defined by plural cement blocks.

15. The combination according to claim 14 wherein each elongate slot in the pre-existing wall is defined by aligned slots in adjacent cement blocks.

16. The combination according to claim 15 wherein each cement block includes two slots formed therein and wherein when plural cement blocks are formed into a wall the two slots in each block align with two slots in adjacent cement blocks.

* * * * *